United States Patent
Poisner

(10) Patent No.: US 6,920,535 B1
(45) Date of Patent: Jul. 19, 2005

(54) ACCESSING MULTI-PORTED MEMORY FOR UNCACHED STATUS AND CONTROL ACCESSES

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 09/672,345

(22) Filed: Sep. 28, 2000

Related U.S. Application Data

(63) Continuation-in-part of application No. 09/572,047, filed on May 16, 2000, now abandoned.

(51) Int. Cl.[7] ............................................. G06F 13/00
(52) U.S. Cl. ..................... 711/154; 711/149; 711/163; 710/37
(58) Field of Search ................................ 711/154, 163, 711/149, 147, 150, 153, 131, 170, 201, 202, 203; 710/37, 240

(56) References Cited

U.S. PATENT DOCUMENTS

| | | | | |
|---|---|---|---|---|
| 4,371,932 A | * | 2/1983 | Dinwiddie et al. ............ | 710/21 |
| 4,796,232 A | * | 1/1989 | House .................... | 365/189.03 |
| 5,544,344 A | * | 8/1996 | Frame ........................ | 711/144 |
| 5,546,554 A | * | 8/1996 | Yung et al. .................. | 711/203 |
| 5,553,307 A | * | 9/1996 | Fujii et al. .................... | 710/24 |
| 5,586,299 A | * | 12/1996 | Wakerly ..................... | 710/110 |
| 5,652,895 A | | 7/1997 | Poisner | |
| 5,664,197 A | | 9/1997 | Kardach et al. | |
| 5,713,002 A | * | 1/1998 | Zbikowski et al. .......... | 711/112 |
| 5,784,699 A | * | 7/1998 | McMahon et al. .......... | 711/170 |
| 5,802,599 A | * | 9/1998 | Cabrera et al. ............. | 711/100 |
| 5,852,608 A | * | 12/1998 | Csoppenszky et al. . | 365/230.05 |
| 5,862,387 A | | 1/1999 | Songer et al. | |
| 5,943,506 A | | 8/1999 | Poisner | |
| 6,167,487 A | * | 12/2000 | Camacho et al. ...... | 365/189.04 |
| 6,216,205 B1 | * | 4/2001 | Chin et al. ............. | 365/230.05 |
| 6,564,266 B1 | * | 5/2003 | Goto et al. .................. | 709/250 |
| 6,680,908 B1 | * | 1/2004 | Gibson et al. .............. | 370/229 |

OTHER PUBLICATIONS

IBM Technical Disclosure Bulletin, Dual–Bus Arbitration for Personal Computer Systems, Jun. 1992, vol. 35, No. 1A, pp 343 347, Jun. 1, 1992.*

Multi–Port Dynamic Random Access Memory Controlle, IBM Technical Disclosure Bulletin, Jul. 1991, vol. 34, No. 2, pp 495–498, Jul. 1, 1991.*

Patterson et al., Computer Architecture: A Quantitative Approach, 1990, 499–568.

* cited by examiner

Primary Examiner—Hong Kim
(74) Attorney, Agent, or Firm—Fish & Richardson P.C.

(57) ABSTRACT

A computer system comprising multi-ported memory electrically coupled to a central processing unit and a peripheral device. The central processing unit and the peripheral device access the multi-ported memory independently.

17 Claims, 4 Drawing Sheets

ACCESSING MULTI-PORTED MEMORY FOR UNCACHED STATUS AND CONTROL ACCESSES

This is a continuation in part of Ser. No. 09/572,047, filed May 16, 2000 which is abandoned in Apr. 15, 2003.

BACKGROUND

This invention relates to accessing multi-ported memory.

In a conventional computing system the central processing unit (CPU), main memory and input/output (I/O) devices are connected by a bus. A "bus master" or "bus arbiter" controls and directs data traffic among the components of the computing system.

Main memory is used as the principal site for storing data. An "access" to main memory writes data to or reads data from main memory. Making an access (or "accessing") is typically preceded by a request for access from another is component of the system, such as the CPU or an I/O device, followed by a grant of permission by the bus arbiter.

There are two principal types of accesses. The first type is a data access, in which large amounts of data are written to or read from main memory. A data access may be on the order of thousands of bytes. The second type is a control/status access, characterized by a small number of reads or writes to a defined data structure in order to report the status of an input/output device, process data, or initiate some input/output activity. In contrast to data accesses, a control/status access is usually on the order of a few bits. Control accesses are generally initiated by the CPU, while status accesses are generally initiated by the I/O devices.

DETAILED DESCRIPTION

Figure 1:
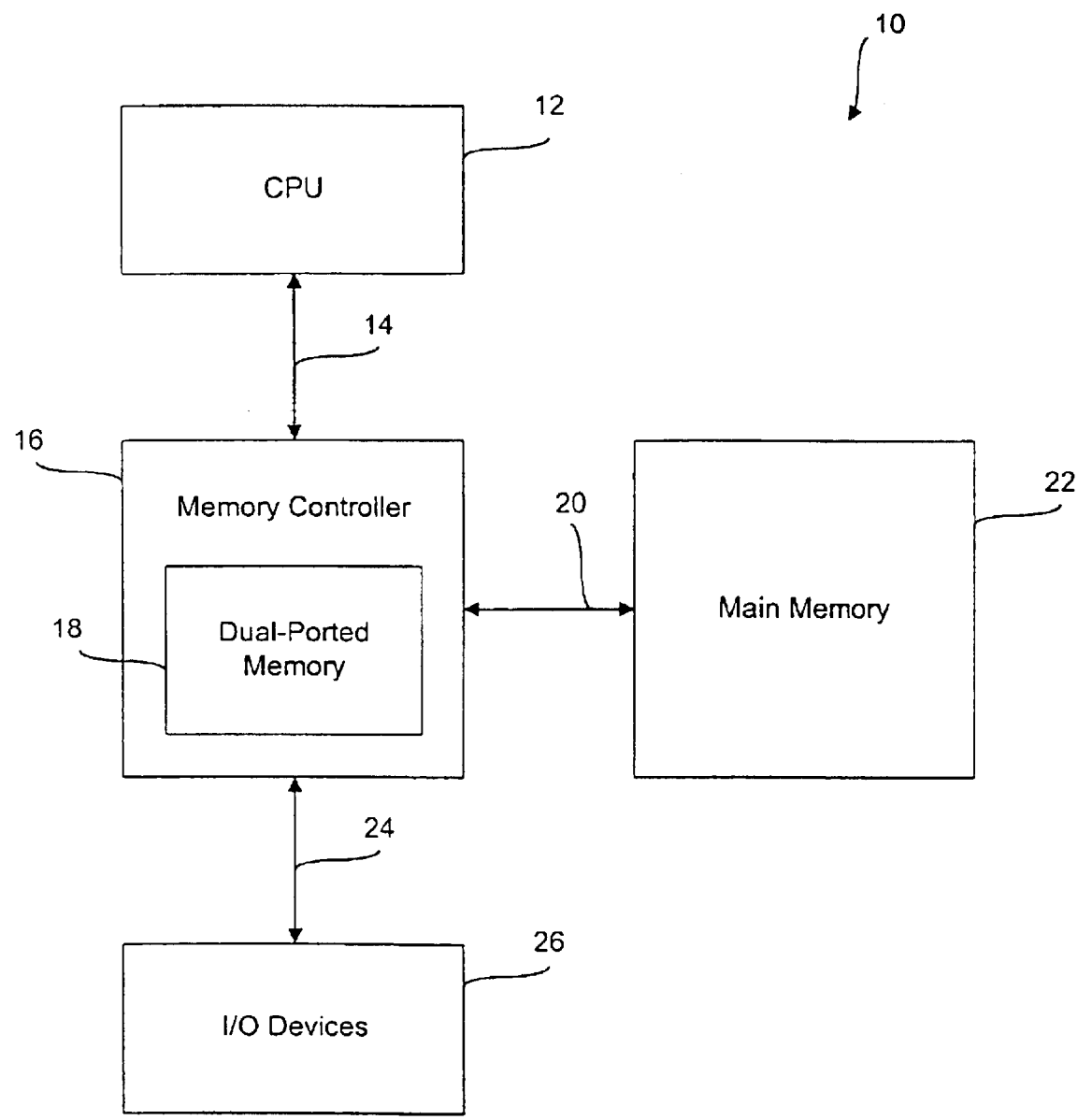
FIGS. 1 and 2 are conceptual block diagrams depicting an embodiment of the invention.

In FIG. 1, a computer architecture 10 includes a central processing unit (CPU) 12, main memory 22 and I/O devices 26. Main memory 22 is generally a form of random access memory (RAM), such as dynamic RAM (DRAM), Rambus™ DRAM (RDRAM), synchronous DRAM (SDRAM) or SyncLink DRAM (SLDRAM). Communications among these components are regulated by a memory controller 16. Memory controller 16 performs the functions of a bus arbiter by managing communications 14 with CPU 12, communications 20 with main memory 22, and communications 24 with I/O devices 26.

Memory controller 16 includes a dual-ported memory 18 that can be accessed by CPU 12 and by I/O device 26 independently. Dual-ported memory 18 can be any form of random access memory although static random access memory, or SRAM, is useful because of its speed and reliability, and some forms of DRAM are useful because DRAM saves chip space. In the embodiments described below, the memory is dual-ported, but the invention is not necessarily limited to two ports. Dual-ported memory 18 may be integrated into a single integrated circuit with memory controller 16, which improves speed and saves chip space.

Typically control/status accesses waste system resources because they are-generally short and have comparatively few bits. Many forms of main memory, such as RDRAM, handle long strings of bits more efficiently than short strings of bits. In addition, as will be discussed below, many conventional computer architectures include a cache memory and ensure cache consistency by employing "bus snooping," i.e., monitoring the communication channels for write accesses to main memory. Bus snooping may require additional logic to be present in each microprocessor and, therefore, can increase the cost and decrease the performance of the microprocessor. The performance degradation incurred by bus snooping is accelerated as the number of short, control/status accesses increases relative to the number of data accesses.

Computer architecture 10 offers a more efficient use of resources by directing control/status accesses to dual-ported memory 18 in controller 16, rather than to main memory 22. By directing control/status accesses to dual-ported memory 18 instead of main memory 22, a bus snoop and its attendant delay are avoided.

There are several ways in which accesses from CPU 12 and I/O device 26 may be directed to dual-ported memory 18. One way is for the computer's operating system to direct appropriate accesses to dual-ported memory 18. Another way is for components to be configured to look for dual-ported memory 18. For example, a controller for I/O device 26 may check controller 16 to see whether dual-ported memory 18 is available, and if dual-ported memory 18 is available, I/O device 26 may use dual-ported memory 18. If dual-ported memory 18 is not available, I/O device 26 may use main memory 22. Other ways in which accesses may be directed to controller's memory exist, and these are not exclusive of each other.

Figure 2:
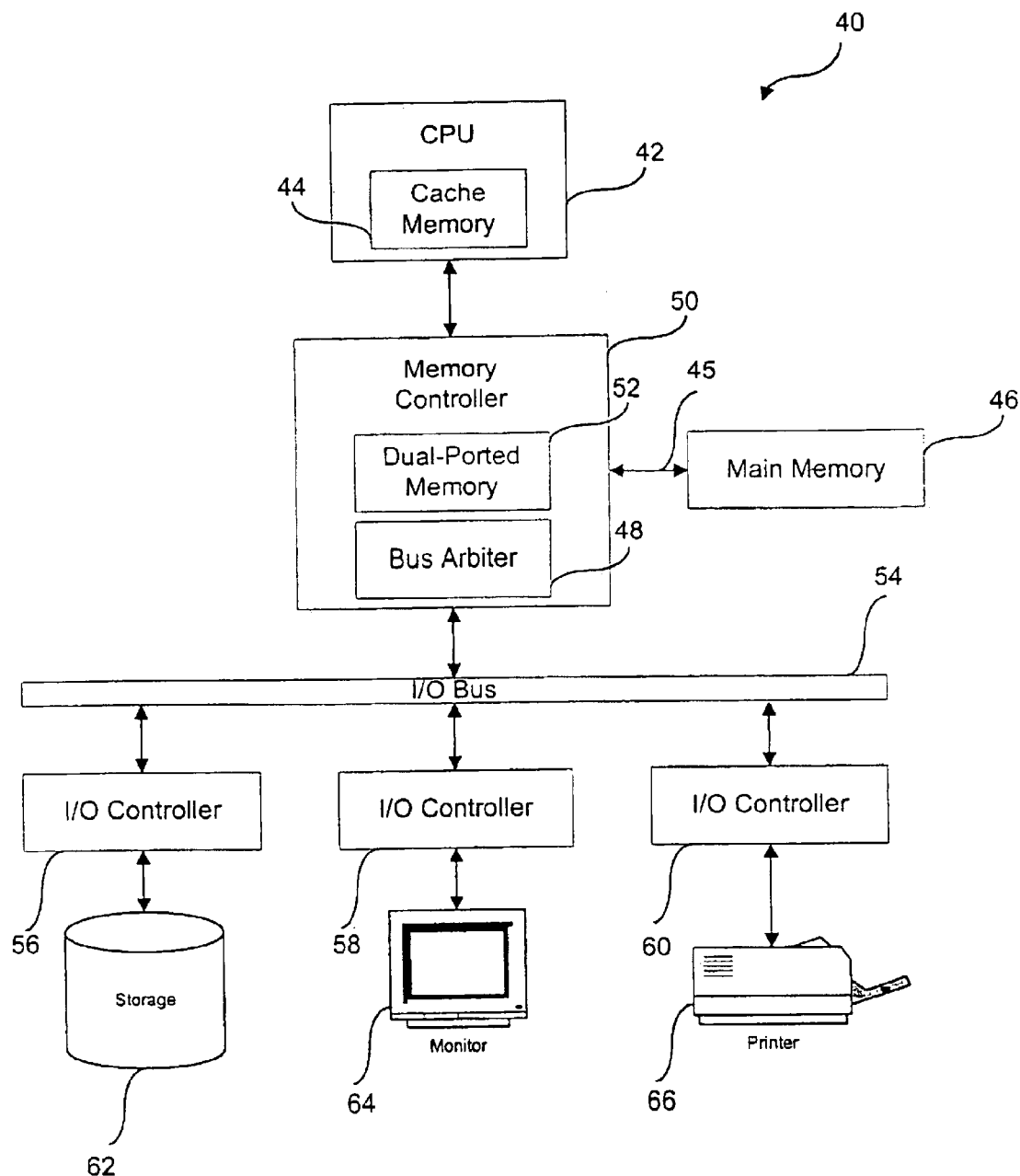

FIG. 2 is a block diagram depicting a computer architecture 40 that includes an embodiment of the invention. FIG. 2 is more detailed than FIG. 1, and shows more of the components typically present within a computer architecture than are shown in FIG. 1. Architecture 40 includes main memory 46 electrically coupled to memory controller 50. Architecture 40 further comprises CPU 42, which is electrically coupled to memory controller 50 and to cache memory 44. Cache memory 44 comprises high-speed RAM for holding data and instructions that, for example, are contained in main memory 46, or originate from main memory 46, and that are recently used by CPU 42. For cache memory 44 to be useful, the information stored in cache memory 44 must be consistent with the data and instructions held in main memory 46. As previously mentioned, bus snooping is a technique used to maintain cache consistency. Cache memory 44 can copy data and instructions from main memory 46 via memory controller 50. In addition, memory controller 50 is coupled to I/O bus 54. Other components may be electrically coupled to memory controller 50 in addition to those shown in FIG. 2.

I/O bus 54 is a communication channel typically dedicated to input/output operations. I/O bus 54 may be a high-speed bus supporting peripherals operating at high data throughput rates, such as a Peripheral Component Interconnect (PCI) bus. The term "peripheral" encompasses but is not limited to external devices attached to the computer system. I/O devices are the most common peripherals. A computer system may have many peripherals, and these devices may interface with the system by way of I/O bus 54.

In FIG. 2, three peripherals are shown for exemplary purposes: an external storage device 62 such as a hard disk, a display device 64 such as a monitor, and a printer 66 such as a laser printer. The peripherals 62, 64, 66 interface with the system through I/O controllers 56, 58, 60, respectively. Although three peripherals 62, 64, 66 are shown, I/O bus 54 is not necessarily limited to use by three peripherals. Other peripherals include devices such as a modem, keyboard, optical drive, network connection, and mouse.

Memory controller 50 also provides a communication connection among components such as CPU 42 and main memory 46. For example, memory controller 50 directs data traffic among CPU 42, main memory 46 and I/O bus 54. Bus arbiter 48, included in memory controller 50, regulates data traffic on I/O bus 54. In addition, memory controller 50 includes dual-ported memory 52, independently accessible by CPU 42 or by any peripheral 62, 64, 66 via I/O bus 54. More specifically, the operating system executing on CPU 42 treats dual-port memory 52 as non-cached memory. As a result, read and write accesses to dual-ported memory 52 do not implicate cache memory 44 and need not be monitored. Therefore, dual-ported memory 52 may be accessed by CPU 42 or by any peripheral 62, 64, 66 without a bus snoop, avoiding the delay caused by the bus snoop.

In this architecture 40, control/status accesses are directed principally to dual-ported memory 52, rather than to main memory 46, thereby avoiding a bus snoop and its attendant delay. The advantages described above, such as speed and efficiency, can be attained with this architecture 40, and "smart" addressing can be used to map a virtual address to a physical address. With smart addressing, addresses are mapped to simplify conversion of the virtual address to the physical address. Smart addressing can avoid operating system calls and can save time by relating virtual and physical addresses through a simple mapping algorithm. Byte-aligning addresses of a page boundary on an external disk 62 with addresses in dual-ported memory 52 is one example of smart addressing. With the addresses byte-aligned, the addresses are related by the addition or subtraction of a constant. With such a mapping, it is not necessary for a device driver to call the operating system to convert a virtual address to a physical address; the device driver can translate the virtual address to a physical address simply by adding or subtracting.

As is evident from FIG. 2, increased usage of dual-ported memory 52 by peripherals results in reduced usage of main memory 46 and consequently less data traffic on the channel 45 connecting main memory 46 to memory controller 50. With less traffic on channel 45, CPU 42 can have greater access to main memory 46, and more information can be transferred between CPU 42 and main memory 46 in a given period of time.

Memory controller's dual-ported memory 52 need not be restricted to reading or writing control/status accesses. In some circumstances, data may be stored in memory 52.

Figure 3:
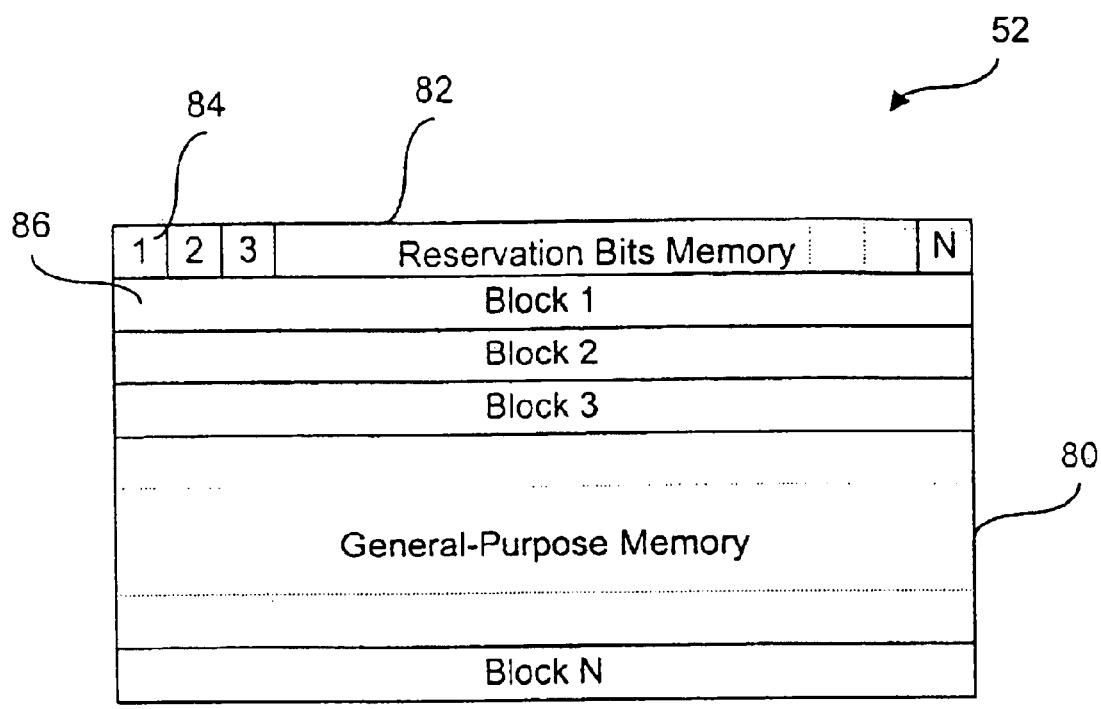
FIG. 3 is a conceptual block diagram depicting a component shown in FIG. 2, illustrating an embodiment of the invention.

As shown in FIG. 3, dual-ported memory 52 can be divided into general-purpose memory 80 and reservation bits memory 82. General-purpose memory 80 may be subdivided into regions or blocks of memory, which may be allocated for use by CPU 42 or by I/O device 62, 64 and 66. Each block may be uniquely identified with a reservation bit, such that for N blocks there are N corresponding reservation bits. For example, the first reservation bit 84 is identified with the first block 86. The number of required reservation bits depends upon the size of general-purpose memory 80 and upon the size of a block. For example, if a block consists of 128 bytes, and if general-purpose memory 80 includes 4 kilobytes of memory, then 32 blocks would be available and 32 reservation bits would be needed (32 bits×128 bytes/bit=4 kilobytes).

The state of a reservation bit denotes whether the reservation bit's corresponding memory block in general-purpose memory 80 has been allocated. For example, a '0' value bit in the first reservation bit 84 may signify that the first memory block 86 is free, while a '1' value bit in the first reservation bit 84 may signify that the first memory block 86 has been allocated for use. When a block of general-purpose memory 80 in dual-ported memory 52 is needed, the reservation bits 82 corresponding to the blocks can be checked to determine whether any blocks are free. When a block in general-purpose memory 80 has been allocated but is no longer needed, the block can be de-allocated by clearing the corresponding reservation bit to indicate that the block is free. In the event all reservation bits 82 show that all general-purpose memory 80 has been allocated, then main memory 48 may be accessed instead.

FIG. 3 exemplifies one of many possible memory organizations in dual-ported memory 52. Reservation bits 82 need not be grouped together as shown in FIG. 3, but may, for example, be denoted as the initial bit of each block. Furthermore, each block of general-purpose memory may have multiple reservation bits mapped to the block.

Figure 4:
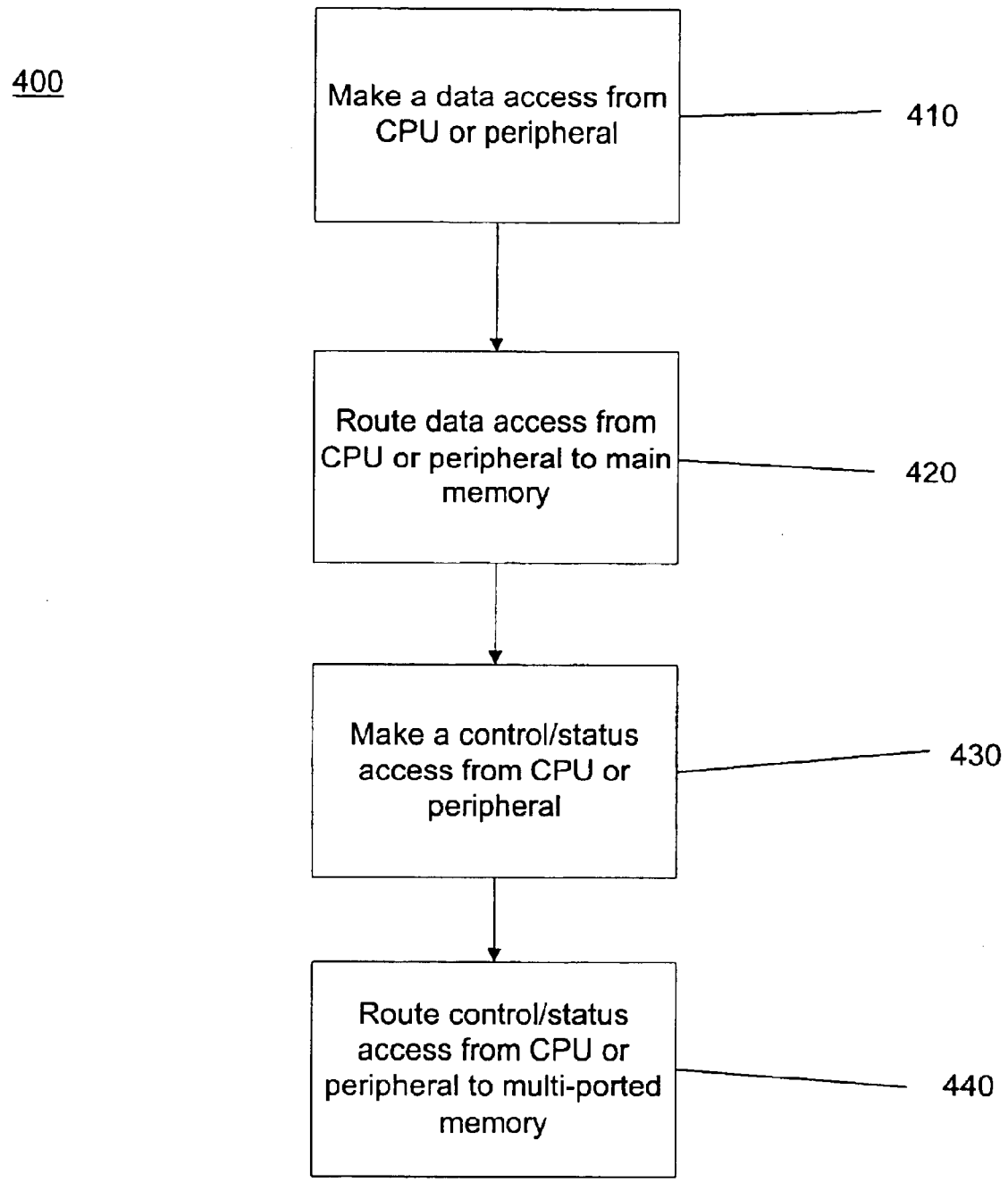
FIG. 4 is a flow diagram showing process steps that may be implemented in a computer system, according to an embodiment of the invention.

FIG. 4 shows a process 400 used by a computer system, according to an embodiment of the invention. In step 410, a data access is made by the CPU or a peripheral device. In step 420, the data access is routed to the main memory. In step 430, a control/status access is made by the CPU or a peripheral device. In step 440, the control/status access is routed to the multi-ported memory. According to some embodiments, the process steps of FIG. 4 may be implemented by the instructions of an article comprising a computer-readable medium which stores computer-executable instructions for memory accessing.

Other embodiments are within the scope of the following claims.

What is claimed is:

1. A data processing system, comprising:
    a processor;
    a main memory;
    a multi-ported memory in communication with the processor and the main memory, the multi-ported memory having a storage capacity of about 4 kilobytes or greater; and
    wherein the system is configured to receive a request to write information to a memory location, wherein the information has an information type equal to data or control information, and wherein the system is further configured to determine a memory destination between the main memory or the multi-ported memory based on the information type.

2. The system of claim 1, further comprising an operating system configured to determine the memory destination based on the information type.

3. The system of claim 1, wherein the system further includes:
    a peripheral device; and
    a peripheral device controller, wherein the controller is configured to determine the memory destination based on the information type.

4. The system of claim 1, wherein the multi-ported memory is included in a memory controller.

5. The system of claim 1, wherein the multi-ported memory is dual-ported.

6. The system of claim 1, wherein the multi-ported memory and memory controller are integrated into a single chip.

7. The system of claim 1, wherein the multi-ported memory includes memory chosen from the group consisting of static random access memory and dynamic random access memory.

8. The system of claim 1, wherein the multi-ported memory stores reservation bits mapped to blocks of general-purpose memory in the multi-ported memory.

9. The system of claim 1, wherein virtual addresses within multi-ported memory are mapped to physical addresses with smart addressing.

10. The system of claim 1, further including:
a memory controller in communication with the main memory and the multi-ported memory; and
a peripheral device in communication with the memory controller via an input/output bus.

11. The system of claim 1, wherein for information with an information type equal to control information, the system is configured to determine the memory destination to be the multi-ported memory and not the main memory.

12. A method comprising:
receiving a request to write information to a memory location;
determining an information type equal to data or control information for the information; and
determining a memory destination between a main memory and a multi-ported memory based on the information type, the multi-ported memory having a storage capacity of about 4 kilobytes or greater.

13. The method of claim 12, further comprising:
writing the information to the memory destination based on the determining the memory destination.

14. The method of claim 12, wherein determining the memory destination between the main memory and the multi-ported memory based on the information type comprises determining the memory destination to be the multi-ported memory for the information type equal to control information.

15. An article comprising a computer-readable medium which stores computer-executable instructions, the instructions causing one or more machines to perform operations comprising:
receiving a request to write information to a memory location;
determining an information type equal to data or control information for the information; and
determining a memory destination between a main memory and a multi-ported memory based on the information type, the multi-ported memory having a storage capacity of about 4 kilobytes or greater.

16. The article of claim 15, further comprising:
writing the information to the memory destination based on the determining the memory destination.

17. The article of claim 15, wherein determining the memory destination between the main memory and the multi-ported memory based on the information type comprises determining the memory destination to be the multi-ported memory for the information type equal to control information.

* * * * *